(No Model.)
C. H. FRENCH & A. T. GIFFORD.
DEVICE FOR CHANGING SPEED.
No. 360,383. Patented Mar. 29, 1887.
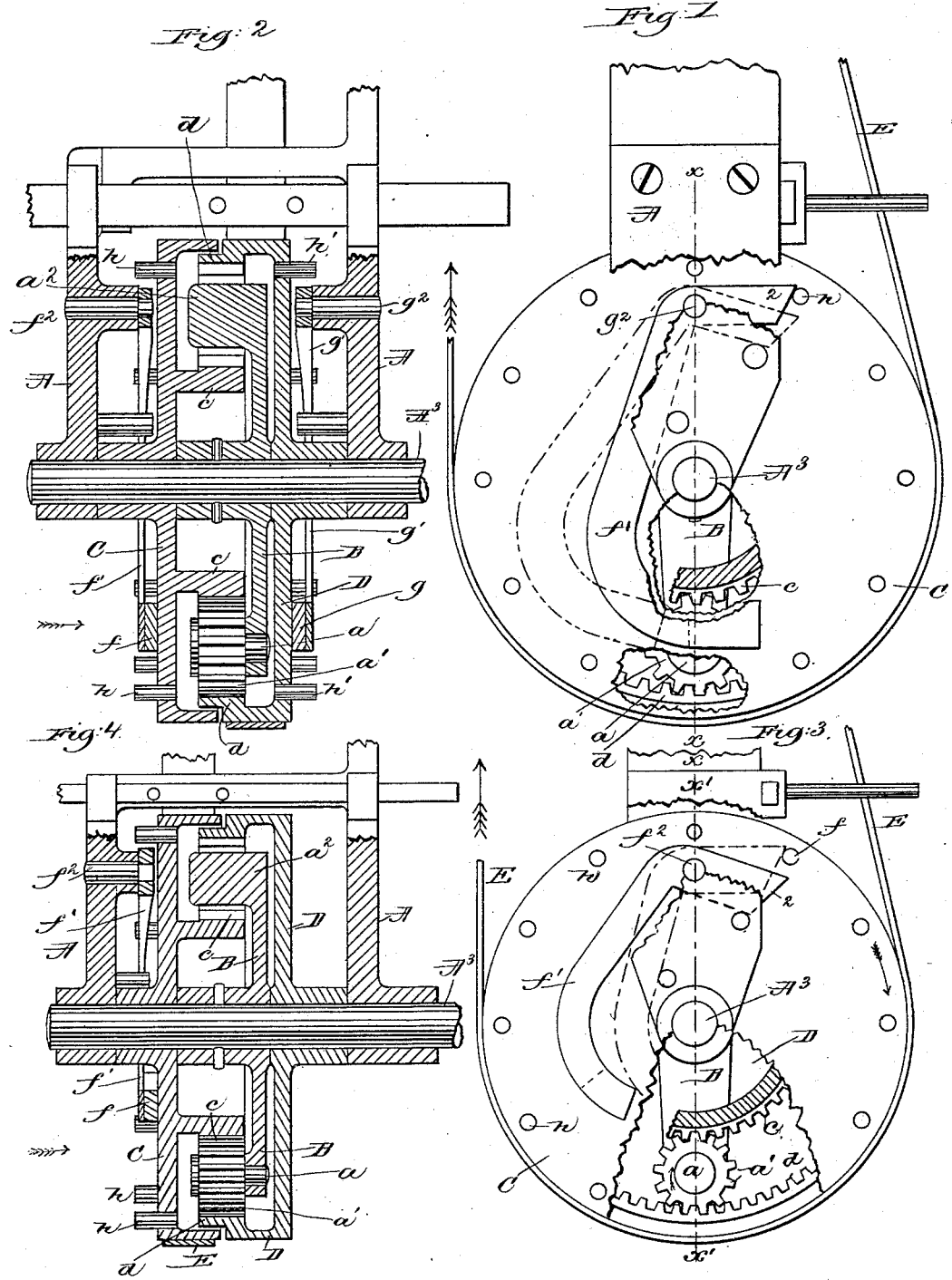
Witnesses.
Fred L. Emery.
John F. C. Prinkett.
Inventors
C. Hermon French
Alonzo T. Gifford
by Emby & Gregory Attys.
N. PETERS, Photo-Lithographer, Washington, D. C.

UNITED STATES PATENT OFFICE.

C. HERMON FRENCH AND ALENZA T. GIFFORD, OF HOPEDALE, ASSIGNORS TO THE SHAW STOCKING COMPANY, OF LOWELL, MASSACHUSETTS.

DEVICE FOR CHANGING SPEED.

SPECIFICATION forming part of Letters Patent No. 360,383, dated March 29, 1887.

Application filed June 22, 1886. Serial No. 205,876. (No model.)

*To all whom it may concern:*

Be it known that we, C. HERMON FRENCH and ALENZA T. GIFFORD, of Hopedale, county of Worcester and State of Massachusetts, have invented an Improvement in Devices for Changing Speed, of which the following description, in connection with the accompanying drawings, is a specification, like letters on the drawings representing like parts.

This invention relates to that class of mechanical movements whereby a fast and slow speed of rotation may be given at different times to the main or other shaft of knitting, spinning, or other machines by means of or through a belt moving at uniform speed.

The particular features in which our invention consist will be hereinafter more fully described, and designated in the claims at the end of this specification.

Figure 1 is an outside elevation of a fast-and-slow-speed mechanism, some of the parts being broken out to show other parts behind them; Fig. 2, a section of Fig. 1 in the line $x$ $x$. Fig. 3 is a like outside elevation of a modified form of our invention, and Fig. 4 a section thereof in the line $x'$ $x'$.

The shaft $A^3$ to be driven at different speeds is supported in suitable hangers, A A, of the frame of the machine containing the said shaft.

The shaft $A^3$ has fast on it the hub of the arm B, which at one end has a stud, $a$, on which is mounted loosely the pinion $a'$, the opposite end of the said arm having a counter-balance, $a^2$, for the weight of the said pinion.

The shaft $A^3$ has loose upon it two pulleys, C D. The pulley C has at its inner side a laterally-projecting toothed ring, $c$, and outside the said toothed portion and at its periphery the said wheel has a band-receiving flange.

The pulley D has a band-receiving peripheral flange and an annular flange, which is toothed to form a ring, $d$. The pinion $a'$, carried by the arm B, secured to the rotating shaft $A^3$, is engaged with both the toothed rings $c$ and $d$, and the said pinion is rotated about its own axis, the stud $a$, whenever either of the toothed ring $c$ or $d$ is rotated by the belt E thereon. The pulley C is acted upon by a friction device composed of a pad, $f$, attached to a sheet spring-pawl, $f'$, pivoted at $f^2$, and the pulley D by a friction device composed of a pad, $g$, attached to a spring-pawl, $g'$, pivoted at $g^2$ on the hanger A, the said friction device having sufficient power to lock the said pulleys at rest, except when positively rotated by the belt E, the pulley not surrounded by the belt being left at rest; but at times it so happens that the belt is partially on each pulley, and then both pulleys rotate at the same speed or as one pulley.

When the belt is on the pulley D, the pulley C is held at rest by one of the pins $h$ therein, which at such time acts against the short end 2 of the pawl $f'$, any slight backward rotation of the said pulley C acting to turn the said pawl and lift its short end into the position, Fig. 1, to be met by the said pin.

The belt on the pulley D will rotate it, and the said pulley in its rotation will carry with it the pinion $a'$, and the arm B, and the shaft $A^3$, the pinion traveling about the then stationary toothed ring $c$, the said shaft $A^3$ being at such time moved more slowly than the pulley D.

If the belt E should be moved so as to rest partially upon both pulleys C and D, both of the same diameter, then both pulleys will be rotated uniformly at the same speed, and the speed will be that due to the belt E. Should the belt E be shifted entirely upon the pulley C, then the slight backward rotation given to the pulley D through the pinion $a'$, as the belt slips entirely upon the pulley C, will cause the friction device co-operating with the pulley D to be moved into position to be struck by one of the pins $h'$ and stop the rotation of the pulley D, and thereafter the toothed ring $c$ in engagement with the pinion $a'$ will cause it and the arm B and shaft $A^3$ to be rotated at a speed slower than that of the pulley C, the slowest speed being when the belt is on the pulley C.

In Figs. 3 and 4 we have omitted the friction device from the pulley D, and when the load carried by the shaft $A^3$ is greater than the power exerted by the pinion $a'$ on the wheel D, the belt being on the pulley C, the main shaft $A^3$ will remain at rest.

In the modification, Figs. 3 and 4, we get but two speeds, the fastest speed being when the belt is on and drives both pulleys, the slow speed being when the belt is on only the pulley D; and when the belt is wholly on the pulley C the pulley D revolves in an opposite direction and the shaft $A^3$ remains at rest, for there is more resistance on the shaft $A^3$ than on the pulley D.

The pawls $f'$ $g'$ and their pads constitute friction devices to co-operate with the pins $h$ and $h'$ and constitute locks for the pulleys against reverse rotation.

We claim—

1. The shaft, the pulley C loose thereon and provided with the toothed ring $c$, and the pulley D, also loose on the said shaft and provided with the toothed ring $d$, combined with the arm B, fast on the said shaft, its attached pinion $a'$ engaging both the said toothed rings, and with a friction device to hold one of the said pulleys when the other one is being rotated, substantially as described.

2. The shaft, the two loose pulleys C D thereon, of like size, and each provided with laterally-extended pins and with a toothed ring of less diameter than the said pulleys, and friction devices bearing on the said pulleys and made movable by the reverse rotation of the said pulleys, as described, combined with the arm B, fast on the said shaft between the said loose pulleys, and provided with a pinion engaging both of the said toothed rings, substantially as described.

In testimony whereof we have signed our names to this specification in the presence of two subscribing witnesses.

C. HERMON FRENCH.
ALENZA T. GIFFORD.

Witnesses:
F. J. DUTCHER,
ARTHUR H. BALL.